Feb. 10, 1942.  J. N. FUNK  2,272,939
CABLE CONNECTOR FOR JUNCTION BOXES
Filed Jan. 22, 1940
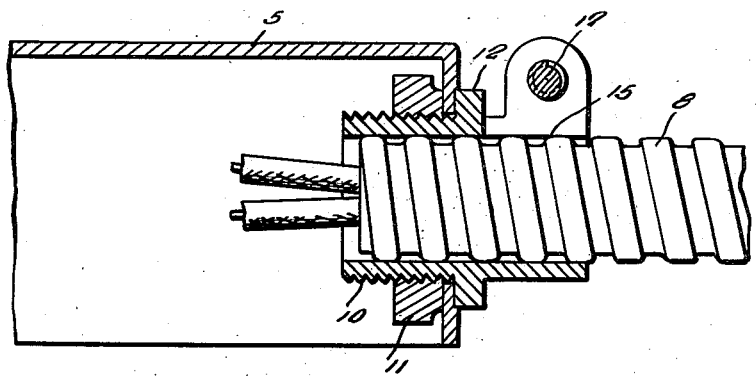
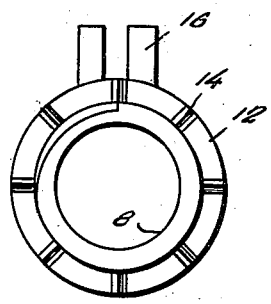
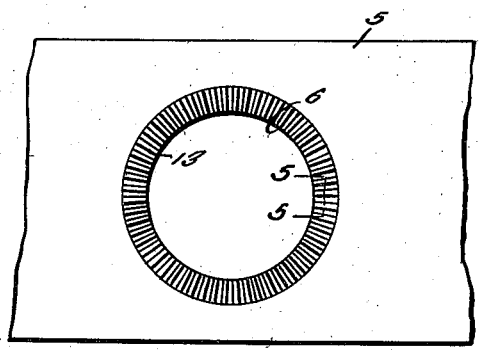
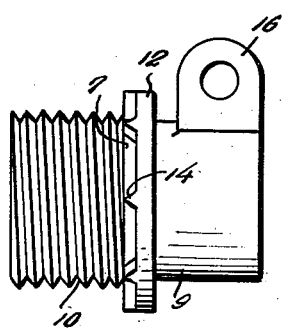
Inventor
Joseph N. Funk
By Clarence A. O'Brien
and Hyman Berman
Attorneys Patented Feb. 10, 1942

2,272,939

UNITED STATES PATENT OFFICE 2,272,939

CABLE CONNECTER FOR JUNCTION BOXES

Joseph N. Funk, Maiden Rock, Wis.

Application January 22, 1940, Serial No. 315,097

1 Claim. (Cl. 285—6.5)

The present invention relates to a new and useful improved connecter fitting for connecting cables to junction boxes and has for its primary object to provide a clamping device through which the cable is inserted and adapted for clamping engagement to the opening of the junction box whereby to prevent turning of the clamping device and the cable while the clamping device is being secured to the box.

A further object is to provide a device of this character of simple and practical construction, which is relatively inexpensive to manufacture, which may be easily and quickly installed in position on the box and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which—

Figure 1 is a fragmentary sectional view of the junction box showing the improved cable clamping device mounted in position therein.

Figure 2 is an end elevational view of the clamp.

Figure 3 is a fragmentary plan view of the side of the box showing the serrated surface about the edge of the opening formed therein.

Figure 4 is a side elevational view of the clamping device, and

Figure 5 is a fragmentary sectional view taken substantially on a line 5—5 of Figure 3.

Referring now to the drawing in detail, the numeral 5 designates the junction box of convential construction and having the opening 6 formed in the wall thereof for receiving the cable clamping device designated generally at 7 and through which the cable 8 is inserted.

The clamping device comprises a sleeve-like member 9 having one end externally threaded as shown at 10 which is positioned inwardly of the box and on which the nut 11 is threaded for bearing against the inner wall of the box. The sleeve at an intermediate portion is provided with an annular flange 12 adapted to bear against the outer wall of the box as clearly shown in Figure 1 of the drawing.

The outer surface of the box at the edge of the opening 6 is serrated as shown at 13, the slits or grooves of the serrations extending radially with respect to the axis of the opening and the inner face of the flange 12 is provided with spaced teeth 14 adapted for engaging the serrated surface of the box to secure the clamping device against turning movement while the nut 11 is being tightened thereon.

The end of the sleeve 9 outwardly of the flange 12 is split longitudinally as shown at 15 and adjacent the split edges is provided a pair of ears 16 for receiving a tightening bolt 17 whereby to tighten the clamping device upon the cable 8.

While the device is illustrated as used in connection with an armored cable, it will be understood that any cable may be employed for clamping in the clamping member 7.

Accordingly, when the cable is clamped in position in the clamping member and the flange 12 is pressed against the outer surface of the box the teeth 14 by reason of the engagement thereof with the serrations 13 will prevent turning movement of the clamping device and consequently prevent turning or twisting of the cable while the nut 11 is being threaded home for clamping the cable in the junction box 5.

It is believed the manner of use of the device will be readily understood without further explanation.

Having thus described the invention, what I claim is:

A connecter fitting of the class described comprising in combination, a junction box having an opening therein, serrations formed on one of the outer faces of said box adjacent said opening and diverging outwardly therefrom and a cable holding device comprising a sleeve adapted for insertion in said opening, an annular flange formed on said sleeve intermediate of its length, said sleeve being externally screw-threaded from the flange to one end, a nut adapted to screw onto said threads, said flange having a plurality of teeth formed on the face thereof directed toward said threads, said teeth and said serrations cooperating to prevent relative rotation therebetween, whereby said cable is held against relative rotation while said connecter is fitted to said box, and means on said sleeve to clamp said cable in said sleeve.

JOSEPH N. FUNK.